Dec. 3, 1957  J. C. OGLE, JR  2,814,970
REVERSIBLE REAR VIEW MIRROR
Original Filed Nov. 17, 1949
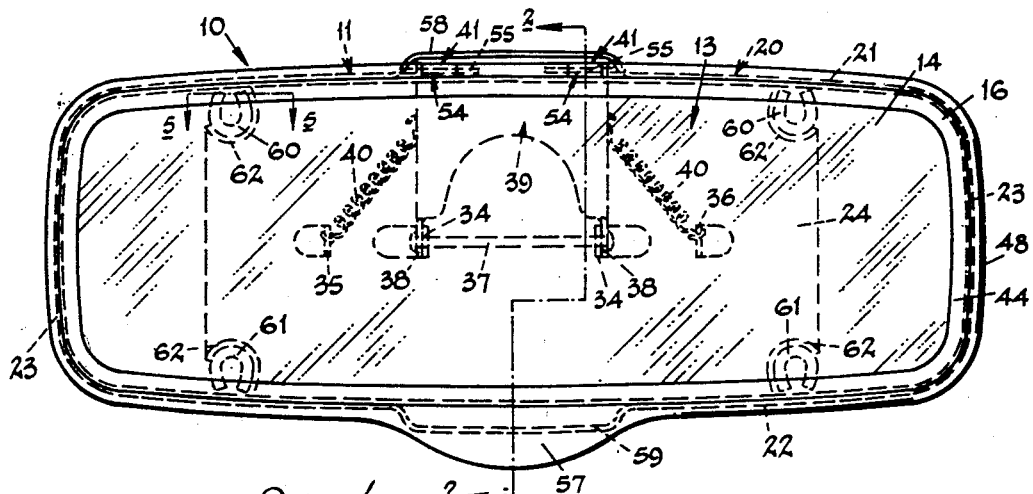
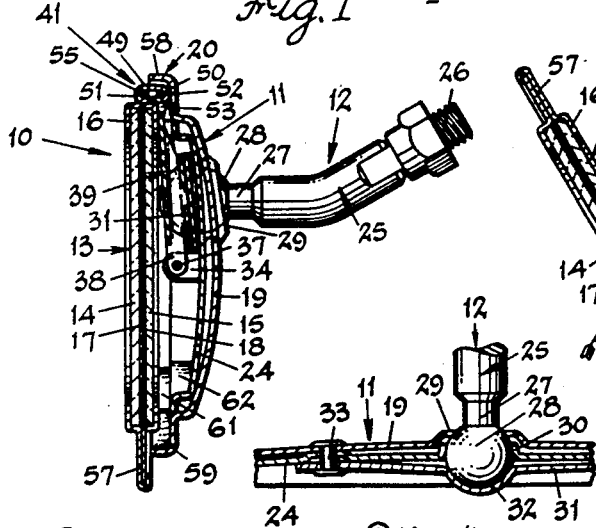
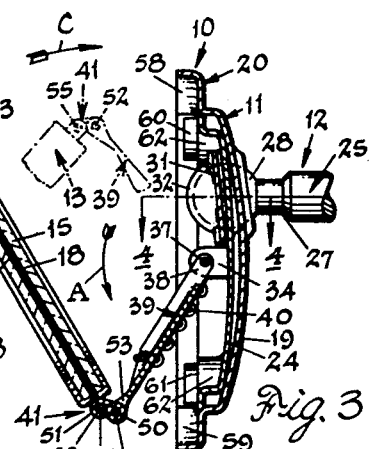
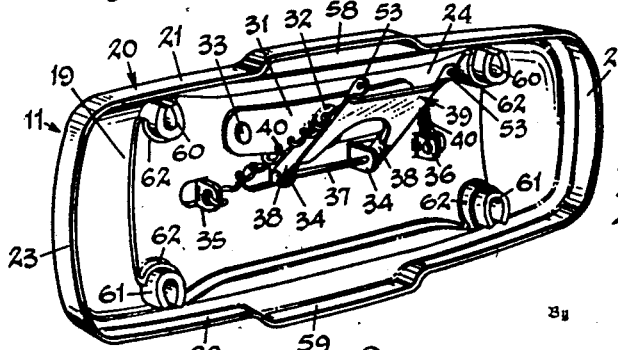
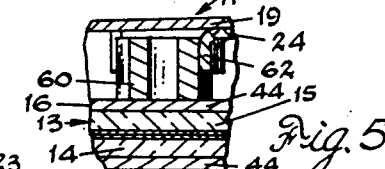
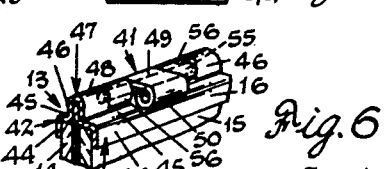
Inventor
James C. Ogle, Jr.
Nobbe & Swope
Attorneys

# United States Patent Office 2,814,970
Patented Dec. 3, 1957

2,814,970

REVERSIBLE REAR VIEW MIRROR

James C. Ogle, Jr., Tarentum, Pa., assignor to Libbey-Owens-Ford Glass Company, Toledo, Ohio, a corporation of Ohio Continuation of application Serial No. 127,808, November 17, 1949. This application January 14, 1954, Serial No. 404,112

11 Claims. (Cl. 88—77)

The present invention relates to rear view mirrors such as are employed in automobiles and the like, of the character which enables the driver of the vehicle to have a clear view of the rear road conditions at all times.

This application is a continuation of my copending application Serial No. 127,808, filed November 17, 1949, now abandoned.

More particularly, the invention has to do with that type of rear view mirror having two mirror surfaces of different reflectivities and being reversible so that either reflective surface may be brought into operative viewing position by the driver of the vehicle, one reflective surface being preferably in the form of an ordinary mirror for use in day driving and the other providing a mirror for night driving which will reduce the brilliance of the reflected headlights of an automobile approaching from the rear.

It is therefore an aim of this invention to provide a rear view mirror of the above type embodying means of a novel and improved character which will enable the driver of the automobile or the like to reverse the mirror in a rapid, efficient manner and with a minimum of care and attention on his part.

Another object of the invention is to provide such a rear view mirror embodying a supporting case, the front of which is open, and a mirror unit associated with the case and adapted to close the front thereof when in normal operative position and being bodily rotatable with respect thereto whereby it can be readily reversed to selectively bring either of the reflecting surfaces into the line of vision of the driver, depending upon whether the mirror is to be used for day or night driving.

Another object of the invention is the provision of a rear view mirror assembly embodying a supporting case upon which the mirror unit is hingedly mounted for bodily rotatable movement, the several parts of the assembly being so associated with each other as to provide a simple, compact arrangement which may be easily actuated by the driver of the vehicle and including novel means for effectively maintaining the mirror unit in normal viewing position, whereby either the day driving or night driving mirror surface can be selectively brought and retained in the line of the driver's vision without requiring his visual attention or otherwise diverting his attention from the road.

A further object of the invention is the provision of such a reversible rear view mirror assembly in which novel means is provided for magnetically maintaining the mirror unit in either of its operative positions with reference to the supporting case and against accidental displacement.

A still further object of the invention is the provision of such a reversible rear view mirror in which permanent magnetic means associated with the supporting case and/or mirror unit are provided to attract the mirror unit toward and effectively hold it in normal operative position.

Other objects and advantages of the invention will become more apparent during the course of the following description, when taken in connection with the accompanying drawings.

In the drawings, wherein like numerals are employed to designate like parts throughout the same:

Fig. 1 is a front elevation of a reversible rear view mirror constructed in accordance with the invention;

Fig. 2 is a vertical transverse section taken substantially on line 2—2 of Fig. 1;

Fig. 3 is a similar vertical transverse section but showing the mirror unit in partially reversed position;

Fig. 4 is a horizontal detail section taken substantially on line 4—4 of Fig. 3;

Fig. 5 is an enlarged detail section of the magnetic holding means taken substantially on line 5—5 of Fig. 1;

Fig. 6 is a fragmentary perspective view of the hinge support for the mirror unit; and Fig. 7 is a perspective view of the interior of the supporting case with the mirror unit removed.

With reference now to the drawing, the numeral 10 designates in its entirety a rear view mirror assembly constructed in accordance with this invention and which comprises generally a supporting case 11, adjustably secured within an automobile or the like by a mounting means 12 and carrying a reversible mirror unit 13.

Although the invention is not limited to the use of any particular type of reversible mirror unit 13, it may be composed, as herein shown, of two mirror elements 14 and 15 arranged in back to back relation and mounted in a bezel 16. The mirror elements 14 and 15 may have their inner, adjacent surfaces provided with reflective coatings 17 and 18 respectively of different reflecting values, with one mirror coating being highly reflecting and suitable for daytime driving and the other mirror coating having a relatively lower reflecting value suitable for night time driving. The mirror unit 13 is hingedly associated with the case 11 in such a manner that it may be bodily rotated by the driver of the vehicle to selectively bring either the mirror element 14 or 15 into operative viewing position in his line of vision.

The supporting case 11 is preferably substantially rectangular in outline and comprises a rear wall 19 arcuately shaped through both its longitudinal and transverse axes and having a forwardly directed peripheral flange 20 defining a top wall 21, bottom wall 22 and opposite end walls 23. Carried by the rear wall 19 of the case is a back plate 24 to which the mirror unit 13 is hingedly connected in a manner to be more fully hereinafter described. The back plate 24 also constitutes a part of the mounting means 12 for supporting the mirror assembly 10 on the framing structure of an automobile or the like.

The mounting means 12 herein shown constitutes but one form of adjustable mounting which may be employed for this purpose and the invention is not to be limited therto. As illustrated, such mounting means comprises an arm 25 which is secured to the framing structure of an automobile by means of its threaded end 26. Opposite this threaded end portion, the arm 25 is provided with a shank 27 of reduced diameter that terminates in a spherical or ball end 28. The shank 27 of the arm extends through an opening 29 in the rear wall 19 of the case, and the ball end 28 is mounted in a spherical bearing or seat 30 formed in the back plate 24. The ball end is retained in this seat by a spring metal strap 31 having a spherical bearing portion 32 conforming to and engaging said ball end. The strap 31 is secured at its opposite ends against the back plate 24 by rivets or the like 33, said rivets also extending through the rear wall 19 of the case 11 and thereby rigidly interconnecting the metal strap 31 and plate 24 to the case 11 as shown in Fig. 4. The bearing portion 32 of the strap 31 coacts with the seat 30 on the back plate 24 to grip the ball end 28 of the arm 25 with sufficient force to maintain the mirror assembly 10 stationary except when the same is adjusted bodily on the ball by the driver of the vehicle.

The back plate 24 is provided with a pair of forwardly directed tabs 34 which are struck from the body of the back plate, while similar tabs 35 and 36 are arranged at opposite sides and outwardly of the tabs 34. The tabs 34, 35 and 36 are in horizontal alignment with one another and are positioned along the horizontal center axis of said plate. Extending between the tabs 34 is a hinge pin 37 upon which is pivotally mounted the inner bifurcated ends 38 of a hinge plate 39. The hinge plate 39 is normally urged inwardly to a position substantially parallel with the back plate 24 by coil springs 40 connected at one end to said plate and at their opposite ends to the tabs 35 and 36 on the respective sides of the back plate. The bezel 16 of the mirror unit is pivotally connected to the outer end of the hinge plate 39 by a pair of double hinges 41 which are so designed as to permit reversal of the mirror unit as the hinge plate pivots on the pin 37 as will be more fully hereinafter described.

The bezel 16 of the mirror unit 13 comprises a pair of relatively thin complementary frame sections 42 and 43 which fit around the edges of the mirror elements 14 and 15. Each frame section consists of a relatively narrow face strip 44 contacting the outer surface of the respective mirror element and having formed integral therewith an inturned web portion 45 disposed opposite the edge of the mirror unit and terminating in an outwardly directed flange 46. As will be noted in Fig. 6, one of the flanges, for example the flange 46 of frame section 42, is spun or folded over the flange of frame section 43, as is indicated at 47, to form a bead 48 extending around the periphery of the mirror unit.

Each double hinge 41 comprises a relatively short link 49 having similarly rolled ends 50 and 51. As illustrated, the rolled ends 50 of the links 49 are pivotally connected to the outer end of the hinge plate 39 by means of a pintle 52 extending between and secured at its end in ears 53 formed integral with and projecting outwardly from the body of the plate 39. The opposite ends 51 of the links are received in notches 54 cut in the bead 48 of the bezel 16 and are pivoted thereto by pintles 55. These pintles extend beyond the links at the oposite sides thereof and the extended end portions are secured by sections 56 formed from the overlapping flange 46 of the frame section 42 and spun or rolled over the ends of the pintles to secure them against displacement.

Along the side of the bezel 16, opposite the hinges 41, and intermediate its ends, the marginal edges of the frame sections 42 and 43 are increased in width and shaped to form a finger grip 57 to facilitate actuation of the mirror by the driver of the vehicle.

In the rear view mirror assembly herein provided, the mirror unit 13 substantially closes the open front of the case 11 when in its normal operative position. At such time, the bead 48 of the bezel 16 is in abutting relation and supported against the outer edge of the peripheral flange 20 of the case to present a neat attractive appearance. To accommodate the outer, free end of the hinge plate 38 and the hinges 41 when the mirror unit is in normal operative position, the top wall 21 and the bottom wall 22 of the peripheral flange 20 are shaped in their central portions to form enlarged housing portions 58 and 59.

Although the tension springs 40 normally serve to urge the hinge plate 39 rearwardly when it passes the horizontal in its upward or downward movement and thereby assist in drawing the hinged side of the mirror unit into place, additional means must be provided for securing the opposite free side of the mirror unit with reference to the case. Thus, this invention contemplates the provision of novel and improved means for maintaining the mirror unit in either of its operative positions in a positive effective manner, to minimize vibration and obviate accidental displacement thereof. Broadly stated, this is accomplished magnetically and more particularly by the use of permanent magnetic means associated with the case 11 and/or mirror unit 13.

While the invention is not limited to any specific form or arrangement of magnetic means, there is herein provided, by way of example, two pairs of magnetized holding members 60 and 61 carried by the back plate 24 (Fig. 7). These members consist of permanent magnets which are substantially U-shaped or of the horseshoe type and which are fixed within recesses 62 provided at the four corners of the back plate. Thus, the magnets 60 are disposed in the upper opposite corners of the back plate adjacent the top wall 21 of the case while the magnets 61 are disposed in the opposite lower corners of said back plate adjacent the lower case wall 22.

The magnets at opposite ends of the back plate are preferably located in equally spaced relation to the vertical axis of the case and are so positioned that when the mirror unit 13 is moved to normal operative position as in Fig. 2, the bezel 16 thereof will be engaged by said magnets. To this end, the bezel is formed either partially or wholly of a magnetic material or possesses magnetic properties so that when the mirror unit is moved to normal operating position, the bezel will be attracted by the permanent magnets 60 and 61 and firmly held in engagement therewith until subsequently disengaged by the driver upon reversal of the mirror. On the other hand, the back plate 24 and/or case 11 may be of a non-magnetic material such as aluminum, stainless steel or plastic so that the strength of the magnets will not be dissipated in the back plate and case but, instead, will induce a maximum degree of magnetism in the magnetic material of which the bezel 16 is formed and thereby assure maximum effectiveness of the magnets in holding the mirror unit in place. However, an ordinary steel case and/or back plate may be used if the magnets are insulated from contact therewith by a non-magnetic material such as aluminum, plastic, or paper. Also, in some instances, the insulating material can be omitted if the magnets are spaced from contact with the case.

In operation, and assuming that the mirror unit 13 is disposed as in Fig. 2, with the mirror element 14 presented to the driver, and the driver desires to reverse said unit to bring the mirror element 15 into viewing position, it is simply necessary for him to grasp the finger grip 57 and pull forwardly thereon to release the mirror unit from engagement with the magnets 60 and 61. When this is done, the driver continues to swing the lower portion of the mirror unit forwardly whereupon the hinge plate 39 is caused to revolve freely in a counter-clockwise direction about the axis of the pin 37 as indicated by the broken lines in Fig. 3 and by the arrow A. Substantially simultaneously, the mirror unit will swing upon the pintles 55 in a clockwise direction as indicated by the arrow B. When the hinge plate 39 passes beyond the horizontal in its downward movement, the springs 40 will act to effect a positive pull upon said hinge plate to draw it downwardly and inwardly so that the mirror unit 13 will assume the full line position in Fig. 3. The hinge plate will thus be moved rearwardly into substantial alignment with the back plate 24 and the hinges 41 located in the lower housing portion 59. The mirror unit is simultaneously pushed inwardly as indicated by arrow C until the bezel 16 thereof contacts the pairs of magnets 60 and 61 which serve to effectively hold the mirror unit in place, with the mirror element 15 in the line of vision of the driver.

To again reverse the positions of the mirror elements 14 and 15 to return the mirror element 14 to viewing position, the operator grasps and pulls forwardly and downwardly upon the finger grip 57 to release the bezel 16 from the influence first of the pair of magnets 60 at the top of the case 11 and subsequently from contact with the magnets 61 at the bottom of the case. As the mirror unit 13 swings downwardly and outwardly upon the double hinges 41, the hinge plate 39 will be caused to swing upwardly in a clockwise direction as shown in full lines in Fig. 3. By substantially simultaneously turning the mirror unit in a counterclockwise direction upon the hinges 41 and applying an upward thrust thereto, the plate 39 will be swung upwardly as indicated in broken lines, while the mirror unit is urged inwardly, as indicated by the arrow C, until it is received within the case and the bezel engages the permanent magnets 60 and 61. Here again, as the hinge plate passes beyond the horizontal in its upward movement, the springs 40 will automatically act to snap the plate 38 rearwardly and thus facilitate reversal of the mirror unit.

When the mirror unit 13 is reversed and the bezel 16 moved inwardly toward the magnets 60 and 61, the magnetism induced thereby in the bezel will assist in drawing the mirror unit inwardly into proper relation with respect to the case and will in fact cooperate with the springs 40 to snap the mirror in place, thereby reducing to a minimum the effort and attention required by the driver in reversing the mirror.

As pointed out above, the magnets 60 and 61 need not be of the specific form disclosed herein nor positioned exactly as shown. For instance, permanent magnetic members in the form of small blocks or relatively narrow strips may be used and likewise the magnetic members can be located in the corners of the case 11 or along the opposite ends thereof, or at the top and bottom of the case intermediate its ends. Further, the magnets may be carried by the back plate 24 and engageable by the hinge plate 39 or secured to the hinge plate itself. In such case, the finger grip or tab 57 could possess magnetic properties to aid in maintaining the mirror unit in place.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

I claim:

1. In a reversible rear view mirror for automobiles and the like, a substantially rectangular supporting case open at the front thereof and having a rear wall provided with mounting means therefor, a mirror unit normally closing the front of the case and having two oppositely facing reflective surfaces of different reflecting values, means for hingedly connecting the mirror unit to the rear wall of the case in such a manner that said mirror unit can be reversed with respect thereto to present the desired reflecting surface to the driver, and magnetic means carried by the inner surface of the case for maintaining the said mirror unit in operative position relative to said case and normally closing the front thereof.

2. In a reversible rear view mirror for automobiles and the like, a substantially rectangular supporting case open at the front thereof and having a rear wall provided with mounting means therefor, a mirror unit normally closing the front of the case and having two oppositely facing reflective surfaces of different reflecting values, means for hingedly connecting the mirror unit to the rear wall of the case in such a manner that said mirror unit can be reversed with respect thereto to present the desired reflecting surface to the driver, and coacting means on said mirror unit and the inner surface of the case for magnetically maintaining the said mirror unit in operative position relative to said case and normally closing the front thereof.

3. In a reversible rear view mirror for automobiles and the like, a substantially rectangular supporting case open at the front thereof and having a rear wall provided with mounting means therefor, a mirror unit normally closing the front of the case and having two oppositely facing reflective surfaces of different reflecting values, means for hingedly connecting the mirror unit to the rear wall of the case so that said mirror unit may be moved outwardly from said case, rotated to present the desired reflecting surface to the driver and returned to normal operating position with respect to said case, and permanently magnetized means carried by the inner surface of the case for maintaining the said miror unit in operative position relative to said case and normally closing the front thereof.

4. In a reversible rear view mirror for automobiles and the like, a substantially rectangular supporting case open at the front thereof and having a rear wall provided with mounting means therefor, a mirror unit normally closing the front of the case and having two oppositely facing reflective surfaces of different reflecting values, means for hingedly connecting the mirror unit to the rear wall of the case so that said mirror unit may be moved outwardly from said case, rotated to present the desired reflecting surface to the driver and returned to normal operating position with respect to said case, and coacting permanently magnetized means and magnetic means on said mirror unit and the inner surface of the case for maintaining the said mirror unit in operative position relative to said case and normally closing the front thereof.

5. In a reversible rear view mirror for automobiles and the like, a substantially rectangular supporting case open at the front thereof and having a rear wall provided with mounting means therefor, a mirror unit normally closing the front of the case and comprising a supporting frame at least partially of a magnetic material and two oppositely facing reflective surfaces of different reflecting values, means for hingedly connecting the mirror unit to the rear wall of the case so that said mirror unit may be moved outwardly from the case, rotated to present the desired reflecting surface to the driver and returned to normal operating position with respect to the said case, and permanent magnetic means carried by the inner surface of said case and engageable by the frame of the mirror unit for maintaining the said mirror unit in operative position relative to said case and normally closing the front thereof.

6. In a reversible rear view mirror for automobiles and the like, a susbtantially rectangular supporting case including a rear wall provided with mounting means therefor, a hinge member pivotally supported at one end by the rear wall of the case inwardly of the opposite ends thereof for swinging movement upwardly and downwardly. about a substantially horizontal axis, a mirror unit positioned in front of the case and having two oppositely facing reflective surfaces of different reflecting values, means for hingedly connecting the mirror unit to the opposite end of said hinge member for swinging movement upwardly and downwardly with respect thereto so that upon swinging of said member in one direction the mirror unit may be simultaneously swung in the opposite direction to effect the reversal of said mirror unit relative to said case to present the desired reflecting surface to the driver, and magnetic means carried by the inner surface of the case for maintaining the said mirror unit in operative position relative to said case and normally closing the front thereof.

7. In a reversible rear view mirror for automobiles and the like, a substantially rectangular supporting case including a rear wall provided with mounting means therefor, a hinge member pivotally supported at one end by the rear wall of the case inwardly of the opposite ends thereof for swinging movement upwardly and downwardly about a substantially horizontal axis, a mirror unit positioned in front of the case and having two oppositely facing reflective surfaces of different reflecting values, means for hingedly connecting one side of the mirror unit to the opposite end of said hinge member for swinging movement upwardly and downwardly with respect thereto so that upon swinging of said member in one direction the mirror unit may be simultaneously swung in the opposite direction to effect the reversal of said mirror unit relative to said case to present the desired reflecting surface to the driver, means for normally urging said hinge member rearwardly toward the case, and coacting magnetic means on said mirror unit and the inner surface of the case for magnetically maintaining the said mirror unit in operative position relative to said case and normally closing the front thereof.

8. In a reversible rear view mirror for automobiles and the like, a substantially rectangular supporting case including a rear wall provided with mounting means therefor, a hinge member pivotally supported at one end by the rear wall of the case inwardly of the opposite ends thereof for swinging movement upwardly and downwardly about a substantially horizontal axis, a mirror unit positioned in front of the case and having two oppositely facing reflective surfaces of different reflecting values, means for hingedly connecting one side of the mirror unit to the opposite end of said hinge member for swinging movement upwardly and downwardly with respect thereto so that upon swinging of said member in one direction the mirror unit may be simultaneously swung in the opposite direction to effect the reversal of said mirror unit relative to said case to present the desired reflecting surface to the driver, spring means for normally urging said hinge member rearwardly toward the case, and coacting permanently magnetized means and magnetic means on said mirror unit and the inner surface of the case for maintaining the said mirror unit in operative position relative to said case and normally closing the front thereof.

9. In a reversible rear view mirror for automobiles and the like, a substantially rectangular supporting case open at the front thereof and including a rear wall provided with mounting means therefor and a forwardly directed peripheral flange, a hinge member pivotally mounted at its inner end upon the rear wall of the case between the top and bottom of the rear wall and also inwardly of the opposite ends thereof for swinging movement upwardly and downwardly about a substantially horizontal axis, a mirror unit normally closing the front of the case comprising a supporting frame at least partially of a magnetic material and two oppositely facing reflective surfaces of different reflecting values, hinge means connecting one side of the mirror unit to the outer end of said hinge member to provide for swinging movement of said mirror unit upwardly and downwardly so that upon swinging of said member in one direction the mirror unit may be simultaneously swung in the opposite direction to effect the reversal of said mirror unit with respect to said case to present the desired reflecting surface to the driver, and permanent magnetic means carried by the inner surface of said case and engageable by the frame of the mirror unit for maintaining the said mirror unit in operative position relative to said case and normally closing the front thereof.

10. In a reversible rear view mirror for automobiles and the like, a substantially rectangular supporting case open at the front thereof and including a rear wall provided with mounting means therefor and a forwardly directed peripheral flange, a hinge member pivotally mounted at its inner end upon the rear wall of the case between the top and bottom and also inwardly of the opposite ends thereof for swinging movement upwardly and downwardly about a substantially horizontal axis, a mirror unit normally closing the front of the case comprising a supporting frame at least partially of a magnetic material and two oppositely facing reflective surfaces of different reflecting values, hinge means connecting one side of the mirror unit to the outer end of said hinge member to provide for swinging movement of said mirror unit upwardly and downwardly so that upon swinging of said member in one direction the mirror unit may be simultaneously swung in the opposite direction to effect the reversal of said mirror unit with respect to said case to present the desired reflecting surface to the driver, means for facilitating the reversal of said mirror unit by the driver, spring means between the hinge member and case for resisting the outward swinging movement of said member, and permanent magnets carried by the inner surface of the case and engageable by the frame of the mirror unit when said mirror unit is moved into operative position relative to said case and normally closing the front thereof.

11. In a reversible rear view mirror for automobiles and the like, a substantially rectangular supporting case open at the front thereof and including a rear wall provided with mounting means therefor and a forwardly directed peripheral flange, a hinge member pivotally mounted at its inner end upon the rear wall of the case between the top and bottom and also inwardly of the opposite ends thereof for swinging movement upwardly and downwardly about a substantially horizontal axis, a mirror unit normally closing the front of the case and including a supporting bezel of magnetic material and two oppositely facing reflective surfaces of different reflecting values, a double hinge comprising a link pivoted at one end to the outer end of said hinge member and at its opposite end to one side of the bezel of the mirror unit to provide for swinging movement of said mirror unit upwardly and downwardly so that upon swinging of said member in one direction the mirror unit may be simultaneously swung in the opposite direction to effect the reversal of said mirror unit to present the desired reflecting surface to the driver, spring means connected at one end to said hinge member and at its opposite end to the rear wall of the case for resisting the outward movement of said member and acting to normally draw it inwardly into the case, and permanent magnetic means carried by the inner surface of the case and engageable by the bezel of the mirror unit when the said mirror unit is moved into operative position relative to the case and normally closing the front thereof.

References Cited in the file of this patent
UNITED STATES PATENTS

| | | |
|---|---|---|
| 1,503,378 | Reid | July 29, 1924 |
| 1,887,706 | Bettman | Nov. 15, 1932 |
| 2,613,104 | Parsons | Oct. 7, 1952 |
| 2,613,575 | Falge | Oct. 14, 1952 |
| 2,640,394 | Bertell | June 2, 1953 |